UNITED STATES PATENT OFFICE 2,537,616

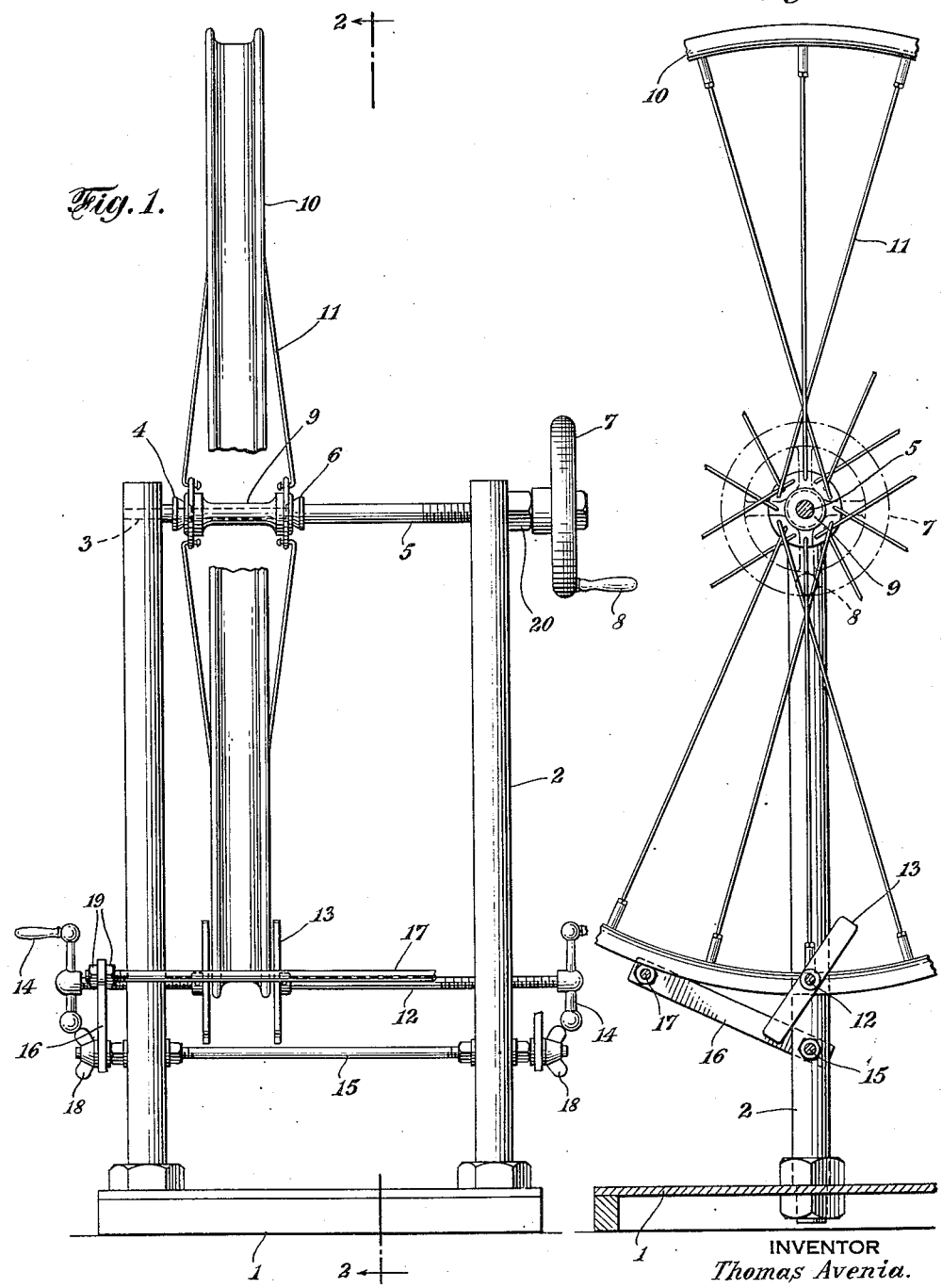

WHEEL TESTER

Thomas Avenia, New York, N. Y.

Application July 19, 1947, Serial No. 762,109

1 Claim. (Cl. 33—203.16)

My invention is an improvement in testing apparatus, especially a device for testing a fully assembled wheel to ascertain if all parts thereof have their true positions and shapes.

The invention is particularly useful in the manufacture and repair of wheels for bicycles; and has for its chief object to provide a suitable stand with adjustable members by which any deformation of any part of a wheel of a bicycle can be made evident at once; so that correction can be effected and the wheel put into condition for regular use or replaced by a new one.

Another object is to provide a device of the type mentioned with but few parts, of simple and inexpensive construction, quite reliable in practice, and easily manipulated for operation.

The nature and advantages of the apparatus are made clear in the following description and the distinguishing features are pointed out in the appended claims. But this disclosure is by way of example only and I reserve the right to make changes in details without deviating from the general principle of the invention or essentially altering any of the characteristics in which the invention resides.

On the drawings, which illustrate a preferred form of the invention,

Figure 1 is a front view of the improved apparatus; and

Figure 2 is a side view thereof, in section on line 2—2 of Figure 1.

The invention in practical form comprises a base 1 to which are affixed uprights 2. Near the top of one of the posts 2 is a journal 3 having a conical head or end 4 presented to the other post; and the latter has a threaded hole in line with the journal 3 to receive a rod 5 having exterior threads to engage the threads in said post. This rod also has a conical head 6 at its extremity between the posts, and its opposite end bears an operating wheel 7 having a crank 8. The pointed heads of the journal 3 and rod 5 engage the opposite ends of the hub 9 of the wheel to be tested, the latter having a rim 10 joined to the hub 9 by the usual steel wire spokes 11. The ends of the hub 9 are equipped with inside ball bearings and when the rod 5 is turned in, the heads of the rod and journal 3 enter the inner raceway rings of said bearings and the wheel is thus rotatably mounted between the posts 2.

Near the base 1 each of the posts carries a threaded rod 12, each of which bears on one extremity a shoe or plate 13. The rods 12 are in line with each other and the shoes or members 13 are adapted to be adjusted into easy contact with the two sides of the rim 10. The rods have cranks 14 on their ends at the outer sides of the posts so that they can be turned by hand. By means of the shoes 13 the flatness of the wheel can be checked. If the rim 10 is bent sideways, the distortion will appear at once when the wheel is turned.

Adjacent the rods 12 the two posts also carry a rod 15 on which are mounted two adjustable arms 16, preferably on the outer sides of the posts or uprights 2. These arms are connected at their outer ends by a rod 17, and can be secured in the required position on the ends of the rod or bar 15 by wing nuts 18. The arms 16 are manipulated and set so as to hold the bar 17 against the outer edge of the rim 8. Then by turning the wheel, the roundness thereof can be checked. If there is a departure at any point from a true circular shape, the fact will be disclosed by the rod 15.

The rod or bar 15 is made fast by lock nuts 18, and the bar or member 17 is secured to the arms 16 by lock nuts 19. Also the bar 5 can be locked in position after adjustment by a nut 20.

The invention is therefore extremely simple and certain of operation. It can be built at little cost, is strong and durable, and the general construction is such that none of the parts is likely to become impaired or get out of order in ordinary use.

The rod 5 will be threaded as far along its length as necessary, and the wheel 7 will be affixed to the outer end thereof in any suitable way, so that by rotating this wheel the bar 5 will be turned. This bar can be locked in working position by means of nut 20, which is of course loosened when the wheel 7 is operated. Another lock nut similar to the lock nut 20, can of course be placed on this bar on the opposite side of the post 2.

Having described my invention, what I believe to be new is:

Apparatus for testing wheels, comprising a base, uprights on said base, one of said uprights having a journal adjacent its upper end, with a cone-shaped end to engage one end of the hub of a wheel; a shaft having threaded engagement with the other upright adjacent the upper end thereof and an extremity shaped to engage the other end of the hub, means for rotating said shaft; rods mounted in said uprights below said shaft and in alinement with each other, said rods being parallel with said shaft and having threaded engagement with said uprights, cranks on said rods, shoes on the adjacent ends of the rods to make contact with the sides of the rim of the wheel, a crossbar on said uprights parallel to and adjacent said rods, arms pivotally mounted each adjacent one end of said crossbar, a bar mounted on said arms substantially parallel to the crossbar, and means for fixing said arms in position for the last-named bar to engage the edge of said rim.

THOMAS AVENIA.

REFERENCES CITED

The following references are of record in the file of this patent:

UNITED STATES PATENTS

| Number | Name | Date |
|---|---|---|
| 563,944 | Thiem | July 14, 1896 |
| 843,754 | Kirstein | Feb. 12, 1907 |
| 2,205,532 | Kohl | June 25, 1940 |
| 2,290,529 | Black | July 21, 1942 |
| 2,408,689 | Seme | Oct. 1, 1946 |

FOREIGN PATENTS

| Number | Country | Date |
|---|---|---|
| 281,996 | Great Britain | July 12, 1928 |
| 725,963 | France | Feb. 22, 1932 |